US008885215B2

(12) United States Patent
Soria et al.

(10) Patent No.: US 8,885,215 B2
(45) Date of Patent: Nov. 11, 2014

(54) COLOR CALIBRATION

(75) Inventors: Juan Uroz Soria, Terrassa (ES); Jordi Arnabat Benedicto, L'Arboc del Penedes Tarragona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 153 days.

(21) Appl. No.: 13/432,384

(22) Filed: Mar. 28, 2012

(65) Prior Publication Data
US 2013/0258359 A1 Oct. 3, 2013

(51) Int. Cl.
*H04N 1/60* (2006.01)

(52) U.S. Cl.
USPC .............................. 358/1.9; 358/406; 358/504

(58) Field of Classification Search
None
See application file for complete search history.

(56) References Cited

U.S. PATENT DOCUMENTS

| 7,453,609 | B2 | 11/2008 | Itagaki | |
|---|---|---|---|---|
| 7,869,087 | B2 | 1/2011 | Wang et al. | |
| 8,189,244 | B2 * | 5/2012 | Fukuhara | 358/518 |
| 8,305,664 | B2 * | 11/2012 | Yasunaga | 358/1.9 |
| 8,335,013 | B2 * | 12/2012 | Quach | 358/1.9 |
| 2007/0153340 | A1 * | 7/2007 | Itagaki et al. | 358/504 |
| 2008/0137150 | A1 * | 6/2008 | Wang et al. | 358/406 |
| 2009/0231644 | A1 * | 9/2009 | Fukuhara | 358/518 |
| 2009/0296118 | A1 * | 12/2009 | Tsukamoto | 358/1.9 |
| 2010/0149567 | A1 | 6/2010 | Kanazawa et al. | |
| 2010/0220363 | A1 | 9/2010 | Paul et al. | |
| 2010/0277751 | A1 * | 11/2010 | Quach | 358/1.9 |
| 2010/0309498 | A1 | 12/2010 | Ishii | |
| 2012/0133961 | A1 * | 5/2012 | Henderson | 358/1.9 |

FOREIGN PATENT DOCUMENTS

JP 2000122067 4/2000

* cited by examiner

*Primary Examiner* — Kimberly A Williams

(57) ABSTRACT

A method of calibrating a printer is disclosed. The printer prints a plurality of patches using know color values. At least two patches of each color are printed. The patches are measured to determine a measured color value for each patch. The measured color values are checked for validity. The printer is calibrated using only the valid measured color values.

12 Claims, 2 Drawing Sheets

COLOR CALIBRATION

BACKGROUND

Some printers may be used to produce multiple copies of photo quality images. To insure the color consistency between each copy of the image, the printer may be calibrated between print runs, or continually during a print run. A printer is typically color calibrated by printing a target with patches using known color values. The target is scanned and the scanned color values are compared to the known color values. The difference between the scanned color values and the known color values are used to adjust the printer to minimize the difference between the color of the printed patches and the expected or known color.

Problems can occur when scanning the color patches on the printed target. The type of scanner typically used to scan the color patches on the target may be sensitive to the distance between the scanner and the target, as well as the angle between the surface of the target and the scanner. The distance between the scanner and the target and the angle between the target's surface and the scanner may vary due to a number of factors. For example, as the target is moved past the scanner, bubbles, wrinkles or creases may form in the target. The bubbles and/or creases may change the distance and angle between the target's surface and the scanner. In addition, the target may not be held down uniformly across the scanning area. These variations in target location and angle can cause inaccuracies in the measurement of the color patches on the target. Inaccuracies in the measured patches will cause inaccuracies in the color calibration of the printer.

DETAILED DESCRIPTION

Figure 1:
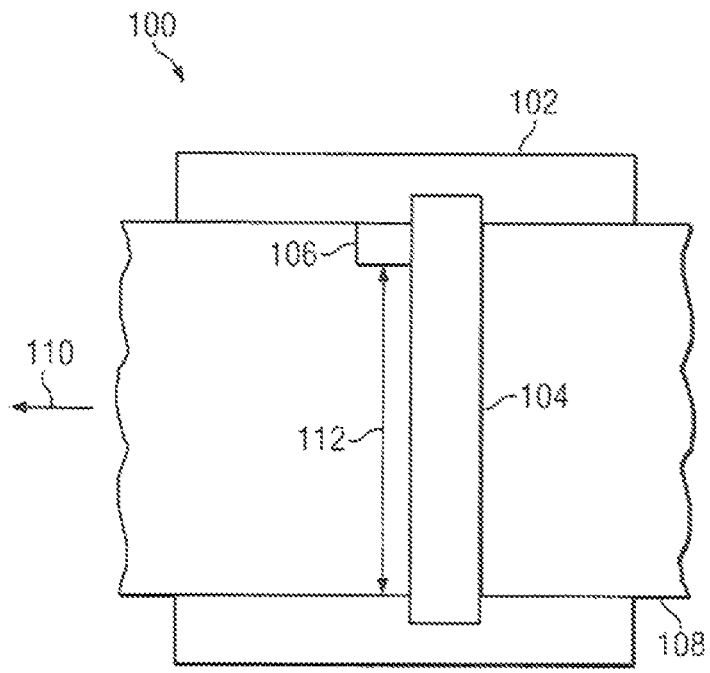
FIG. 1 is a schematic illustration of a printing system according to an example embodiment of the invention.
Figure 2:
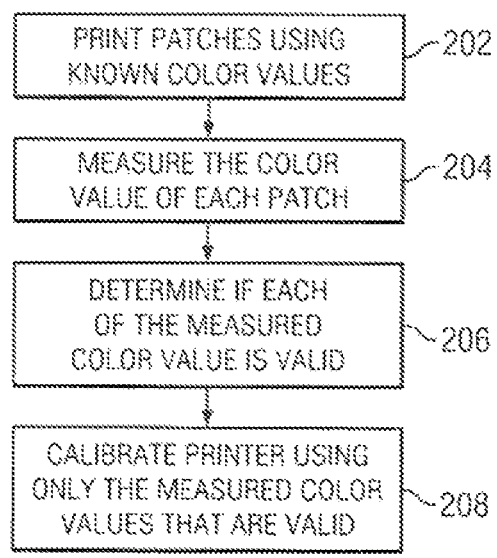
FIG. 2 is a flow chart for a calibration routine in an example embodiment of the invention.

FIGS. 1-3, and the following description depict specific examples of the invention. For the purpose of teaching inventive principles, some conventional aspects have been simplified or omitted. Those skilled in the art will appreciate variations from these examples that fall within the scope of the invention. The features described below can be combined in various ways to form multiple variations of the invention. As a result, the invention is not limited to the specific examples described below, but only by the claims and their equivalents.

FIG. 1 is a top view of printer 100 in an example embodiment of the invention. Printer 100 includes a base 102, a print bar 104, a scanner 106, and is loaded with media 108. Media 108 is shown as a continuous sheet or roll moving through the printer in a print direction as shown by arrow 110. In other embodiments, media may be fed through the printer as individual sheets. Print bar 104 is attached to base 102 and stretches over and across media 108. In this example print bar 104 is a page wide array of print heads. In other examples, a carriage containing one or more print heads may move back and forth across media 108 along axis 112 during printing. A print bar is one example of a marking engine. Other types of marking engines may also be used, for example a LaserJet marking engine.

Scanner 106 is attached to print bar 104 on the downstream side of the print bar 104, thereby allowing scanner 106 to scan images printed by print bar 104. In this example, scanner 106 can traverse along print bar 104 along axis 112 allowing scanner to scan any portion of media 108. In other examples, multiple scanners 106 may be rigidly attached at different locations along print bar 104. In yet other examples, the scanner may be a hand held device.

Printer 102 may contain additional element not shown for clarity. For example, a media transport system comprising motors and rollers for moving media 108, ink reservoirs, pumps, and tubing to supply ink to the print bar 104, drying elements and the like. Printer 100 may also contain one or multiple controllers for controlling the operation of the printer. The controllers may be located in base 102, or may be located external to base 102. Each controller may comprise processors, application specific integrated circuits (ASIC), random access memory, non-volatile memory, and the like. Code, stored in the memory, when executed by a processor on one of the controllers, causes the printer to run a calibration routine. The calibration routine may be executed between print runs, or may run simultaneously with a print run.

FIG. 2 is a flow chart for a calibration routine in an example embodiment of the invention. At step 202 the controller controls the printer to print a number of color patches using known color values. At step 204 the controller controls the scanner to scan each of the color patches to determine a measured color value. At step 206 the controller determines if each measured color value is valid or invalid. At step 208 the controller calibrates the printer using only the measured color values that are valid. The printer is calibrated by making adjustments that minimize the difference between the known color values and the measured color values. Some of the adjustments that may be used are the mixtures of the different inks, the amount or concentration of the pigment in the inks, the drying time, the curing temperature, the number of ink droplets, and the like.

At step 202 the controller controls the printer to print a number of color patches with known color values. The printer will typically print 10-16 different colors for each primary colorant. Some printers only use 3 different primary colorants, for example CYM. Other printers may use four or six different primary colorants. A printer using six different primary colorants, and printing ten different color patches for each primary colorant, would print 60 different colors on the calibration target. When printing the color patches, some areas of the target may have bubbles, wrinkles, or creases that cause the scan of the patch to be inaccurate.

To avoid the problems of scanning patches that have bubbles, wrinkles or creases, each color patch is printed more than once. In one example embodiment of the invention, each color patch is printed three times. In other examples more than three patches of each color may be printed. With 60 different colors to print, and three patches for each color, the calibration target would have 180 patches. The three different patches for each color will be spaced apart from each other such that a single bubble, wrinkle or crease will not affect more than one of the patches. By printing each color patch multiple times and spacing the patches away from each other, the likelihood that all three patches will be affected by a bubble, wrinkle or crease is minimized.

Figure 3A:
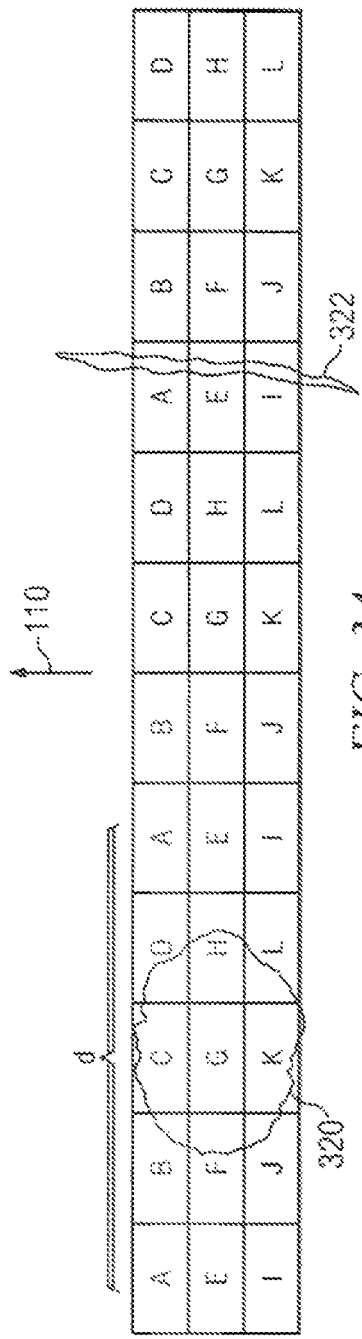
FIG. 3A is a drawing of the layout of the color patches in an example embodiment of the invention.

FIG. 3A is a drawing of the layout of the color patches in an example embodiment of the invention. Arrow 110 indicates the direction of media movement during printing. Each letter represents a patch of a different color. Each color has been printed three times. In other examples, each color may be printed a different number of times, for example 4, 5 or 6 times. The colors are shown printed in an ordered pattern, i.e. a set of 4 colors are printed three times in a row. Other arrangements may be used to print the color patches as long as the identical patches for each color are spaced apart from one another. For clarity this example only uses 12 different colors, a real calibration target may have up to 96 different colors (6 primary colorants times 16 different colors for each primary colorant).

In this example, the three patches of the same color are spaced apart horizontally by distance d. Distance d is selected such that it is greater than the width of a typical crease, bubble or wrinkle. Typically distance d will be selected such that it is at least 2 to 3 times larger than the width of a typical crease, bubble or wrinkle. For example, system tests show that creases typically grow along the direction of media advance (in the direction of arrow 110) and the width of a crease seldom exceeds five centimeters. Therefore in one example distance d would be selected to be at least a multiple of 5 centimeters, for example 20 centimeters or more.

In some printers the media is supported by a plurality of parallel media support ribs after it passes under the print bar. The ribs are typically aligned parallel to the direction of media movement. The distance d may be selected such that the center of each patch lines up with one of the plurality of ribs. This will help maintain a uniform height between the media and the scanner along the centerline of the patches.

FIG. 3A has artifacts 320 and 322 shown on the color patches. Artifact 320 represents a large bubble formed during the printing of the color patches and artifact 322 represents a crease formed during the printing of the color patches.

At step 206 in FIG. 2, each measured color value is checked to determine if it is valid. Determining if a measured color value is valid can be done in a number of different ways. One way is to measure the color value of each of the three identical color patches and compare the measured values. When the measured value of all three identical color patches are within a given tolerance of each other, the three measured values are valid. When one of the measured values is different from the other two measured values by more than a predetermined amount, that measured value is determined to be invalid.

The measured color value may be the red, green and blue (RGB) values from a standard scanner, the values from a spectrophotometer, or the measured color values may be from a custom instrument that reports the color data in arbitrary, non-industry standard units and scale. The measured color value may be in any color space, for example the CIELAB color space (Lab for short), or RGB color space. The measured color value may use only the lightness or intensity value in some color spaces, for example in the Lab color space, only the $L^*$ value may be used. In other examples a single number resulting from a calculation involving all the components of a color space may be used, for example a single number from calculations involving $L^*$, $a^*$ and $b^*$ or from RGB. In other examples, different components of a color space may be used for different color patches when comparing the measured values. For example, $L^*$ may be used for all color patches except for the yellow patches, where $b^*$ is used.

In FIG. 3A the first patch of color "G" is in the center of artifact 320 (a large bubble). When the measured value of the first patch of color "G" is compared to the measured value of the other two patches of color "G", the measured value of the first patch of color "G" may be different than the measured value of the other two patches by more than a threshold value. For example, the $L^*$ measured values of the three patches of color "G" may be 23, 14 and 13 respectively. The color values of the second two patches of color "G" that are not affected by an artifact are only one delta $L^*$ apart. The first patch of color "G" is 9 and 10 delta $L^*$'s apart from the other two measured values, respectively. When one measured value is different from the other measured values by more than a threshold, the measured color value is deemed invalid. In one example the threshold may be set at 4 delta $L^*$s. 9 and 10 delta $L^*$s are greater than the threshold, therefore the measured value of the first patch of color "G" is invalid and would not be used for the color calibration.

The other two patches of color "G" were within one delta $L^*$ of each other, which is under the 4 delta $L^*$ threshold, so both these measurements are deemed valid. The color value used in calibration may be an average of all the valid color measurement, the mean value of all the valid color measurement, or the like.

Figure 3B:
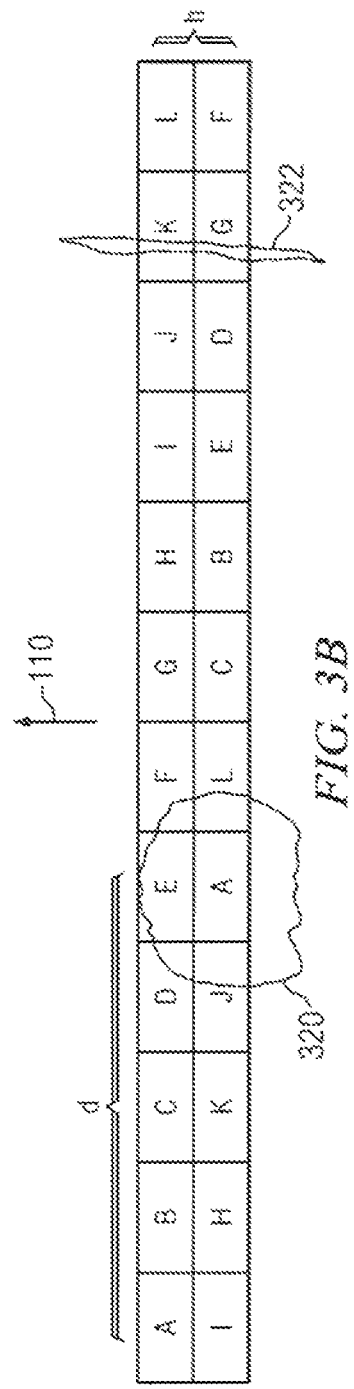
FIG. 3B is a drawing of the layout of the color patches in another example embodiment of the invention.

FIG. 3B is a drawing of the layout of the color patches in another example embodiment of the invention. Arrow 110 indicates the direction of media movement during printing. Each letter represents a patch of a different color. Each color has been printed twice. In this example, the two patches for each color are spaced apart in both the horizontal and vertical direction. The distance between the two patches having the same color in the horizontal direction is distance d and the distance between the two patches having the same color in the vertical direction is distance h. For clarity this example only uses 12 different colors, a real calibration target may have up to 96 different colors (6 primary colorants times 16 different colors for each primary colorant).

The distance d in the horizontal direction varies between colors. The distance between any two identical color patches is d were d equals either four or six patches. By changing the spacing between some of the identical color patches, the colors surrounding the identical color patches are different for each patch. For example, the color patches surrounding the first "A" color patch are B, H and I. The color patches surrounding the second "A" patch are D, E, F J and L. By proper arrangement, each patch of a given color can be surrounded by a different set of other colors even when only two patches of each color are printed.

FIG. 3B has artifacts 320 and 322 shown on the color patches. Artifact 320 represents a large bubble formed during the printing of the color patches and artifact 322 represents a crease formed during the printing of the color patches.

In this example, the measured value of a color patch is determined to be valid by locating artifacts on the target. Color measurements taken where artifacts are present are invalid, color measurements taken in the absence of an artifact are valid. Artifacts are located by comparing the measure color values of the different identical color patches and the color patches surrounding them. Because each pair of identical colors have a different set of surrounding colors, artifacts can be located using the surrounding colors and the measurements of their matching patches.

To locate an artifact, the color values of pairs of identical colors are measured and the two measured values are compared. When the difference in the two measured values is greater than a threshold, one of the two patches will have an artifact located on the patch. Initially, it will be unknown which of the two patches contains the artifact. By correlating where a mismatch occurs between the measurements of the surrounding colors, the location of the artifact can be identified.

For example, when the two measured values of the "A" color patches are compared they will have a difference greater than a threshold value. That indicates that one of the two "A"

patches has an artifact affecting the measurement. Initially it is unknown which of the two "A" patches contain the artifact. The first "A" patch has patches B, I and H next two it. When the two measured values for the two B patches are compared, the difference between the measurements will be within the threshold value (because neither B patch has an artifact located with it). The same will be true with the measured values of the I and H patches. The second "A" patch has patches D, E, F, J and L surrounding it. When the measured color values for each pair of these patches are compared, the difference between the measured values for each pair of identical color patches will be above the threshold. Therefore the location of the artifact can be identified as at the second "A" patch and the measured color value of that patch will be marked as invalid.

An artifact 322 (e.g. a crease) can also be located by looking at the measured color values for colors K and G. When the two measured values of the K color patches are compared they will have a difference greater than the threshold value. The same is true for the G color. Only one location on the target has the color patches K and G next to each other. Therefore the artifact must be located at that place on the target.

Another way to determine when a measurement for a color patch is invalid is by actually measuring the height between the patch and the scanner. When the distance is within the nominal tolerance value the measurement will be valid. When the height is outside the nominal tolerance value, the measurement will be marked as invalid. The height will not be outside the nominal tolerance value unless a bubble or crease has caused a change in the height or distance between the patch and the scanner. In an example embodiment, the nominal tolerance value is plus or minus 1 mm. Three different methods for determining when a measured color value is valid have been described. These methods can be used individually or in combinations with one another.

What is claimed is:

1. A method for calibrating a printer, comprising:
   printing, with the printer, a plurality of patches onto media using a plurality of known color values, where there are at least two patches of each of the plurality of known color values;
   measuring a color value for each of the plurality of patches;
   determining if each of the measured color values is valid;
   calibrating the printer using only the measured color values that are determined to be valid;
   wherein there are at least three patches of each of the plurality of known colors, and where a patch is determined to be invalid when the measured color value of the patch does not correlate with the measured color values of the other patches of the same color, and where a patch is determined to be valid when the measured color value of the patch does correlate with the measured color value of at least one of the other patches of the same color.

2. The method for calibrating a printer of claim 1, wherein the at least two patches of each of the plurality of known colors are spaced apart by distance d in a direction perpendicular to a media movement direction.

3. The method for calibrating a printer of claim 2, wherein distance d is at least greater than 2 times an average artifact size.

4. The method for calibrating a printer of claim 2, wherein distance d is a multiple of a spacing between media output path support ribs.

5. The method for calibrating a printer of claim 1, further comprising;
   measuring the distance between a scanner, used to measure the color values of each patch, and each of the plurality of patches;
   marking the measured color value of each of the plurality of patches as invalid when the measured distance for that patch is outside a nominal tolerance value;
   marking the measured color value of each of the plurality of patches as valid when the measured distance for that patch is within the nominal tolerance value.

6. A printer, comprising:
   a marking engine for marking media;
   a media transport system for moving media through the marking engine;
   at least one scanner to scan the marked media and measure a color value of the marked media;
   a controller comprising at least one processor and memory;
   code stored in the memory, the code, when executed by the at least one processor, causing the printer to run a calibration routine;
   the calibration routing causing the printer to print a plurality of patches onto media using a plurality of known color values, where there are at least two patches of each of the plurality of known color values;
   the scanner measuring a color value for each of the plurality of patches;
   the controller determining if each of the measured color values is valid;
   the controller calibrating the printer using only the measured color values that are valid;
   wherein there are at least three patches of each of the plurality of known colors, and where a patch is determined to be invalid when the measured color value of the patch does not correlate with the measured color values of the other patches of the same color, and where a patch is determined to be valid when the measured color value of the patch does correlate with the measured color value of at least one of the other patches of the same color.

7. The printer of claim 6, further comprising;
   the controller locating artifacts among the plurality of patches;
   the controller marking the measured color value of all patches containing an artifact as invalid;
   the controller marking the measured color value of all patches that do not contain an artifact as valid.

8. The printer of claim 6, wherein the at least two patches of each of the plurality of known colors are spaced apart by distance d in a direction perpendicular to a media movement direction.

9. The printer of claim 8, wherein distance d is at least greater than 2 times an average artifact size.

10. The printer of claim 8, wherein the at least two patches of each of the plurality of known colors are spaced apart by distance H in a direction parallel to the media movement direction, where H is equal to at least the height of one of the plurality of color patches.

11. The printer of claim 6, further comprising;
    the controller determining the distance between a scanner, used to measure the color values of each patch, and each of the plurality of patches;
    the controller marking the measured color value of each of the plurality of patches as invalid when the distance for that patch is outside a nominal tolerance value;
    the controller marking the measured color value of each of the plurality of patches as valid when the distance for that patch is within the nominal tolerance value.

12. A method for calibrating a printer, comprising:
printing, with the printer, a plurality of patches onto media using a plurality of known color values, where there are at least two patches of each of the plurality of known color values;
measuring a color value for each of the plurality of patches;
determining if each of the measured color values is valid;
calibrating the printer using only the measured color values that are determined to be valid;
locating artifacts among the plurality of patches;
marking the measured color value of all patches containing an artifact as invalid;
marking the measured color value of all patches that do not contain an artifact as valid.

* * * * *